(12) United States Patent
Sato et al.

(10) Patent No.: US 11,897,286 B2
(45) Date of Patent: Feb. 13, 2024

(54) PNEUMATIC TIRE

(71) Applicant: Toyo Tire Corporation, Itami (JP)

(72) Inventors: Yoshiki Sato, Itami (JP); Toshiyuki Ohashi, Itami (JP)

(73) Assignee: Toyo Tire Corporation, Itami (JP)

( * ) Notice: Subject to any disclaimer, the term of this patent is extended or adjusted under 35 U.S.C. 154(b) by 468 days.

(21) Appl. No.: 17/109,739

(22) Filed: Dec. 2, 2020

(65) Prior Publication Data

US 2021/0178825 A1    Jun. 17, 2021

(30) Foreign Application Priority Data

Dec. 12, 2019   (JP) ................................. 2019-224318

(51) Int. Cl.
*B60C 11/01* (2006.01)
*B60C 13/02* (2006.01)

(52) U.S. Cl.
CPC .............. *B60C 11/01* (2013.01); *B60C 13/02* (2013.01)

(58) Field of Classification Search
CPC ................................ B60C 11/01; B60C 13/02
USPC ................................................. D12/579, 605
See application file for complete search history.

(56) References Cited

U.S. PATENT DOCUMENTS

| | | | |
|---|---|---|---|
| 6,530,405 B1 * | 3/2003 | Brown | B60C 11/11 |
| | | | 152/902 |
| D548,173 S * | 8/2007 | Herbeuval | D12/596 |
| D567,749 S * | 4/2008 | Brown | D12/579 |
| D891,358 S * | 7/2020 | Kuwahara | D12/605 |
| 2013/0139936 A1 | 6/2013 | Ohara | |
| 2018/0065422 A1 * | 3/2018 | Kuwano | B60C 11/01 |
| 2019/0193477 A1 * | 6/2019 | Kuwano | B60C 13/02 |

FOREIGN PATENT DOCUMENTS

JP   2000-280711 A   * 10/2000
JP   2013-119277 A      6/2013

OTHER PUBLICATIONS

Machine translation for Japan 2000-280711 (Year: 2023).*

* cited by examiner

*Primary Examiner* — Steven D Maki
(74) *Attorney, Agent, or Firm* — WHDA, LLP

(57) ABSTRACT

As viewed in a tire circumferential direction, a maximum value of an amount by which a first inner portion protrudes toward the exterior in a tire width direction beyond a second inner portion is greater than a maximum value of an amount by which the second inner portion protrudes toward the exterior in the tire width direction beyond a first inner portion, and as viewed in the tire circumferential direction, a maximum value of an amount by which a second outer portion protrudes toward the exterior in the tire width direction beyond a first outer portion is greater than a maximum value of an amount by which the first outer portion protrudes toward the exterior in the tire width direction beyond the second outer portion.

13 Claims, 7 Drawing Sheets

PNEUMATIC TIRE

CROSS REFERENCE TO RELATED APPLICATIONS

This application claims the benefit of priority of Japanese application no. 2019-224318, filed on Dec. 12, 2019, which is incorporated herein by reference.

BACKGROUND OF THE INVENTION

Field of the Invention

The present disclosure relates to a pneumatic tire.

Description of the Related Art

Conventionally a pneumatic tire might, for example, comprise a sidewall region extending in the tire radial direction, and the sidewall region might comprise a plurality of side blocks arrayed in the tire circumferential direction (e.g., JP2013-119277A). In addition, under bad road conditions such as when the terrain is sandy, rocky, and/or muddy, because traction (nonslipping grabbing force) is produced due to the plurality of side blocks, it is possible to improve driveability under bad road conditions.

It so happens that the traction that is produced will be greater to the extent that the side blocks protrude by large amounts in the tire width direction. As a result, depending on the pattern of surface irregularities formed by the side blocks that are adjacent in the tire circumferential direction, it may be the case that a bias will arise with respect to the amount of traction that is produced by the side blocks.

SUMMARY OF THE INVENTION

It is therefore an object of the present disclosure to provide a pneumatic tire that will make it possible to suppress occurrence of bias in the respective amounts of traction produced by side blocks that are mutually adjacent in the tire circumferential direction.

There is provided a pneumatic tire comprises a sidewall region that extends in a tire radial direction;

the sidewall region comprises a plurality of side blocks which are arrayed in a tire circumferential direction, and an annular projection which extends in the tire circumferential direction and which protrudes in a tire width direction;

the plurality of side blocks include a first side block and a second side block that are adjacent in the tire circumferential direction;

the first side block comprises a first outer portion which is arranged toward the exterior in the tire radial direction from the annular projection, and a first inner portion which is arranged toward the interior in the tire radial direction from the annular projection;

the second side block comprises a second outer portion which is arranged toward the exterior in the tire radial direction from the annular projection, and a second inner portion which is arranged toward the interior in the tire radial direction from the annular projection;

a location at which distance in the tire circumferential direction between the first inner portion and the second inner portion is a minimum is toward the interior in the tire radial direction from centers in the tire radial direction of first inner portion and second inner portion;

as viewed in the tire circumferential direction, a maximum value of an amount by which the first inner portion protrudes toward the exterior in the tire width direction beyond the second inner portion is greater than a maximum value of an amount by which the second inner portion protrudes toward the exterior in the tire width direction beyond the first inner portion; and as viewed in the tire circumferential direction, a maximum value of an amount by which the second outer portion protrudes toward the exterior in the tire width direction beyond the first outer portion is greater than a maximum value of an amount by which the first outer portion protrudes toward the exterior in the tire width direction beyond the second outer portion.

Further, there is provided a pneumatic tire comprises a sidewall region that extends in a tire radial direction;

the sidewall region comprises a plurality of side blocks which are arrayed in a tire circumferential direction, and an annular projection which extends in the tire circumferential direction and which protrudes in a tire width direction;

the plurality of side blocks include a first side block and a second side block that are adjacent in the tire circumferential direction;

the first side block comprises a first outer portion which is arranged toward the exterior in the tire radial direction from the annular projection, and a first inner portion which is arranged toward the interior in the tire radial direction from the annular projection;

the second side block comprises a second outer portion which is arranged toward the exterior in the tire radial direction from the annular projection, and a second inner portion which is arranged toward the interior in the tire radial direction from the annular projection;

a location at which distance in the tire circumferential direction between the first inner portion and the second inner portion is a minimum is toward the interior in the tire radial direction from centers in the tire radial direction of first inner portion and second inner portion;

a maximum value of an amount by which the first inner portion protrudes relative to a profile surface is greater than a maximum value of an amount by which the second inner portion protrudes relative to the profile surface; and a maximum value of an amount by which the second outer portion protrudes relative to the profile surface is greater than a maximum value of an amount by which the first outer portion protrudes relative to the profile surface.

BRIEF DESCRIPTION OF DRAWINGS

FIG. 6 is a drawing in which FIG. 4 and FIG. 5 are placed one atop the other;

DETAILED DESCRIPTION OF THE INVENTION

Below, an embodiment of a pneumatic tire is described with reference to FIG. 1 through FIG. 6. At the respective drawings (and the same is true for FIG. 7 and FIG. 8), note that dimensional ratios at the drawings and actual dimensional ratios are not necessarily consistent, and note further that dimensional ratios are not necessarily consistent from drawing to drawing.

Figure 1:
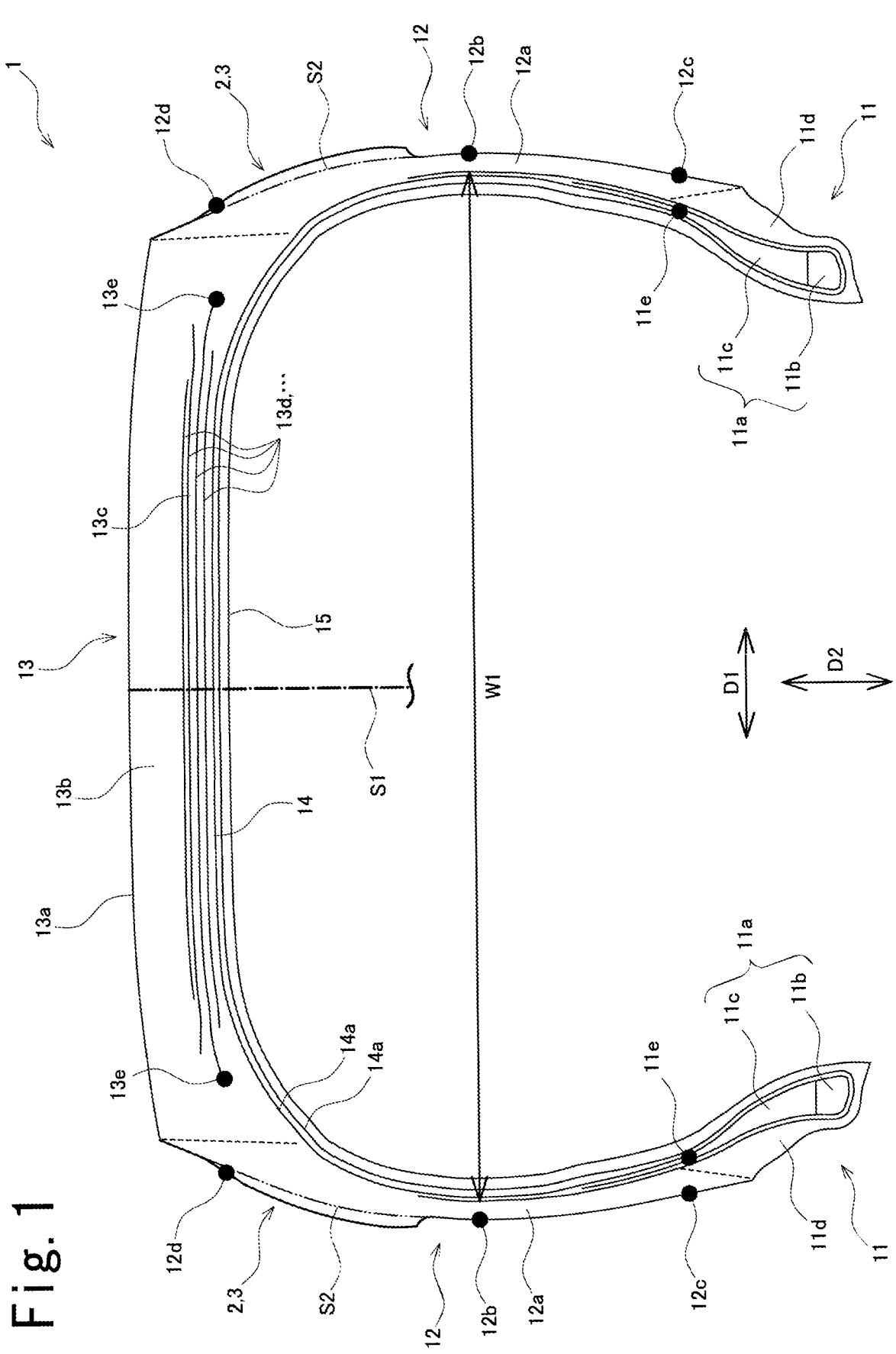
FIG. 1 is a view of a section, taken along a tire meridional plane, of the principal components in a pneumatic tire associated with an embodiment.

As shown in FIG. 1, pneumatic tire (hereinafter sometimes referred to as simply "tire") 1 is provided with a pair of bead regions 11 having beads 11*a*; sidewall regions that extend toward the exterior in the tire radial direction D2 from respective bead regions 11; and tread region 13 having, at the exterior in the tire radial direction D2, tread surface 13*a* which comes in contact with the ground and which is coupled to the respective exterior edges in the tire radial direction D2 of the pair of sidewall regions 12. Note that tire 1 may be mounted on a rim (not shown).

Furthermore, tire 1 is provided with carcass layer 14 suspended between pair of beads 11*a*, 11*a*; and inner-liner layer 15 that is arranged toward the interior from carcass layer 14 and that faces the interior space of tire 1 which is or will be filled with air. Carcass layer 14 and inner-liner layer 15 are arranged in parallel fashion with respect to the inner circumferential surface of the tire over a portion thereof that encompasses bead regions 11, sidewall regions 12, and tread region 13.

At the respective drawings, first direction D1 is the tire width direction D1 which is parallel to the rotational axis of the tire, second direction D2 is the tire radial direction D2 which is the direction of the diameter of tire 1, and third direction D3 is the tire circumferential direction D3 which is the direction that is circumferential about the rotational axis of the tire. Furthermore, tire equatorial plane S1 is a plane that is located centrally in the tire width direction D1 and that is perpendicular to the rotational axis of the tire; tire meridional planes are planes that are perpendicular to tire equatorial plane S1 and that contain the rotational axis of the tire.

In the tire width direction D1, the side toward the interior is the side which is nearer to tire equatorial plane S1, and the side toward the exterior is the side which is farther from tire equatorial plane S1. Furthermore, in the tire radial direction D2, the side toward the interior is the side which is nearer to the tire rotational axis, and the side toward the exterior is the side which is farther from the tire rotational axis.

Bead 11*a* is provided with bead core 11*b* which is formed so as to be annular in shape, and bead filler 11*c* which is arranged toward the exterior in the tire radial direction D2 from bead core 11*b*. For example, bead core 11*b* might be formed by laminating rubber-covered bead wire(s) (e.g., metal wire(s)), and bead filler 11*c* might be formed from hard rubber that has been made to taper as one proceeds toward the exterior in the tire radial direction D2.

Bead region 11 is provided with rim strip rubber 11*d* which is arranged toward the exterior in the tire width direction D1 from carcass layer 14 and which is intended to constitute the outer surface that will come in contact with the rim. Sidewall region 12 is provided with sidewall rubber 12*a* which is arranged toward the exterior in the tire width direction D1 from carcass layer 14 and which is intended to constitute the outer surface.

Tread region 13 is provided with tread rubber 13*b* at which the outer surface constitutes tread surface 13*a*, and belt region 13*c* which is arranged between tread rubber 13*b* and carcass layer 14. Belt region 13*c* is provided with a plurality (four at FIG. 1) belt plies 13*d*. For example, belt plies 13*d* might be provided with a plurality of belt cords (e.g., organic fiber and/or metal) which are arrayed in parallel fashion, and topping rubber with which the belt cords are covered.

Carcass layer 14 is made up of at least one (two at FIG. 1) carcass ply 14*a*. Carcass ply 14*a* folds back upon itself and wraps about bead 11*a* so as to envelop bead 11*a*. Furthermore, carcass ply 14*a* is provided with a plurality of ply cords (e.g., organic fiber and/or metal) which are arrayed in direction(s) more or less perpendicular to the tire circumferential direction D3, and topping rubber with which the ply cords are covered.

Inner-liner layer 15 has superior functionality in terms of its ability to impede passage of gas therethrough so as to permit air pressure to be maintained. At sidewall region 12, note that inner-liner layer 15 is in intimate contact with the inside circumferential surface of carcass layer 14, there being no other member that intervenes between inner-liner layer 15 and carcass layer 14.

For example, distance between the inner circumferential surface of the tire (inner circumferential surface of inner-liner layer 15) and the carcass ply 14*a* which is arranged nearest to the inner circumferential surface might be 90% to 180% at sidewall region 12 of what it is at tread region 13. More preferably, this distance might be 120% to 160% at sidewall region 12 of what it is at tread region 13.

Sidewall regions 12 are such that provided at the outer surface thereof are locations 12*b* which are at the same locations in the tire radial direction D2 as the locations at which tire width is a maximum (more specifically, the locations at which distance W1 between respective exterior points in the tire width direction D1 of carcass layer 14 is a maximum). Below, these locations 12*b* are referred to as tire maximum width locations 12*b*.

Furthermore, sidewall regions 12 are such that provided at the outer surface thereof are locations 12*c* which are at the same locations in the tire radial direction D2 as exterior edges 11*e* of bead filler 11*c* in the tire radial direction D2. Below, these locations 12*c* are referred to as bead edge locations 12*c*.

Furthermore, sidewall regions 12 are such that provided at the outer surface thereof are locations 12*d* which are at the same locations in the tire radial direction D2 as the outer ends 13*e* of belt region 13*c* in the tire width direction D1. Below, these locations 12*d* are referred to as belt end locations 12*d*.

Figure 2:
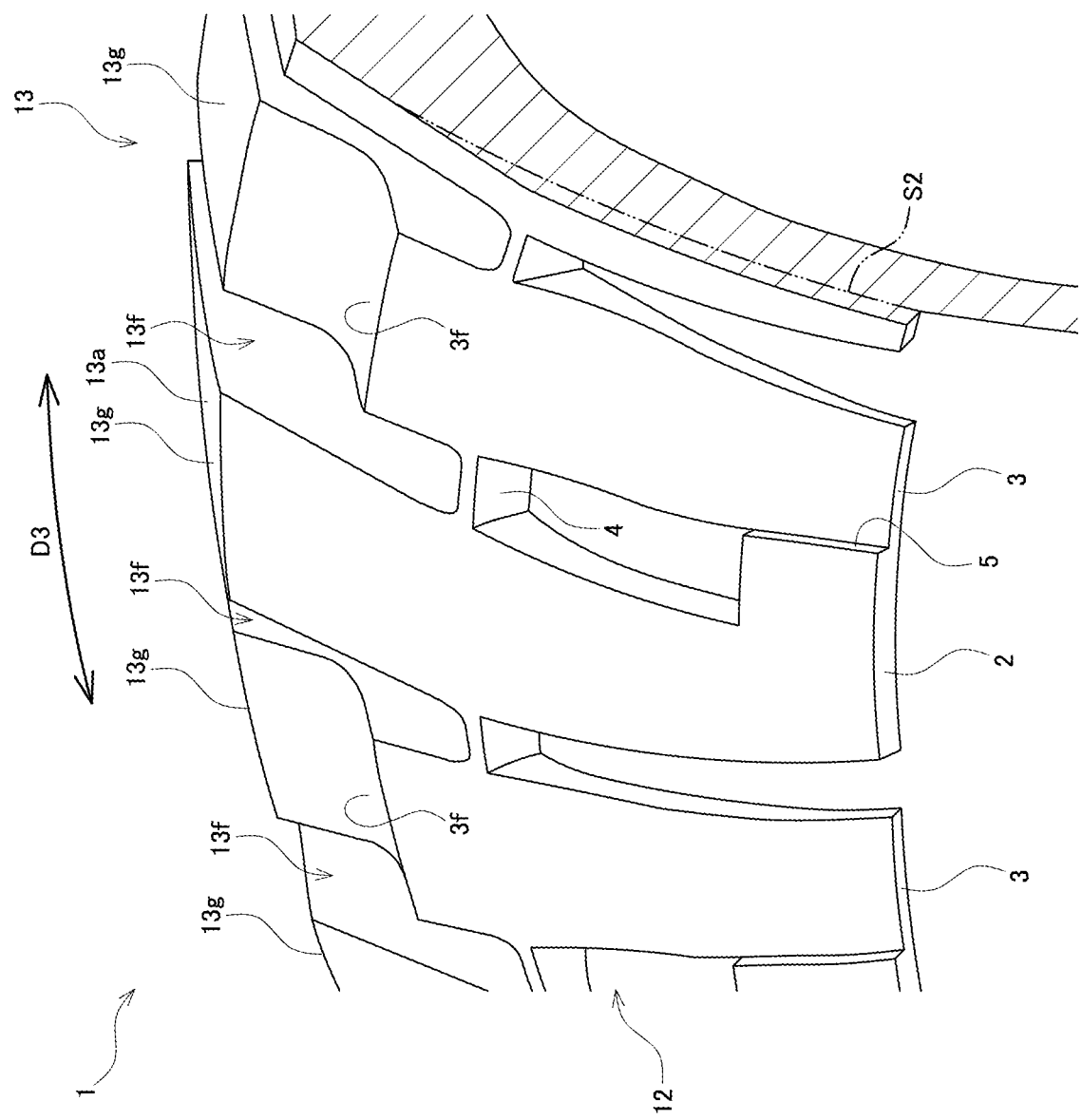
FIG. 2 is a perspective view of the principal components in a pneumatic tire associated with same embodiment.
Figure 3:
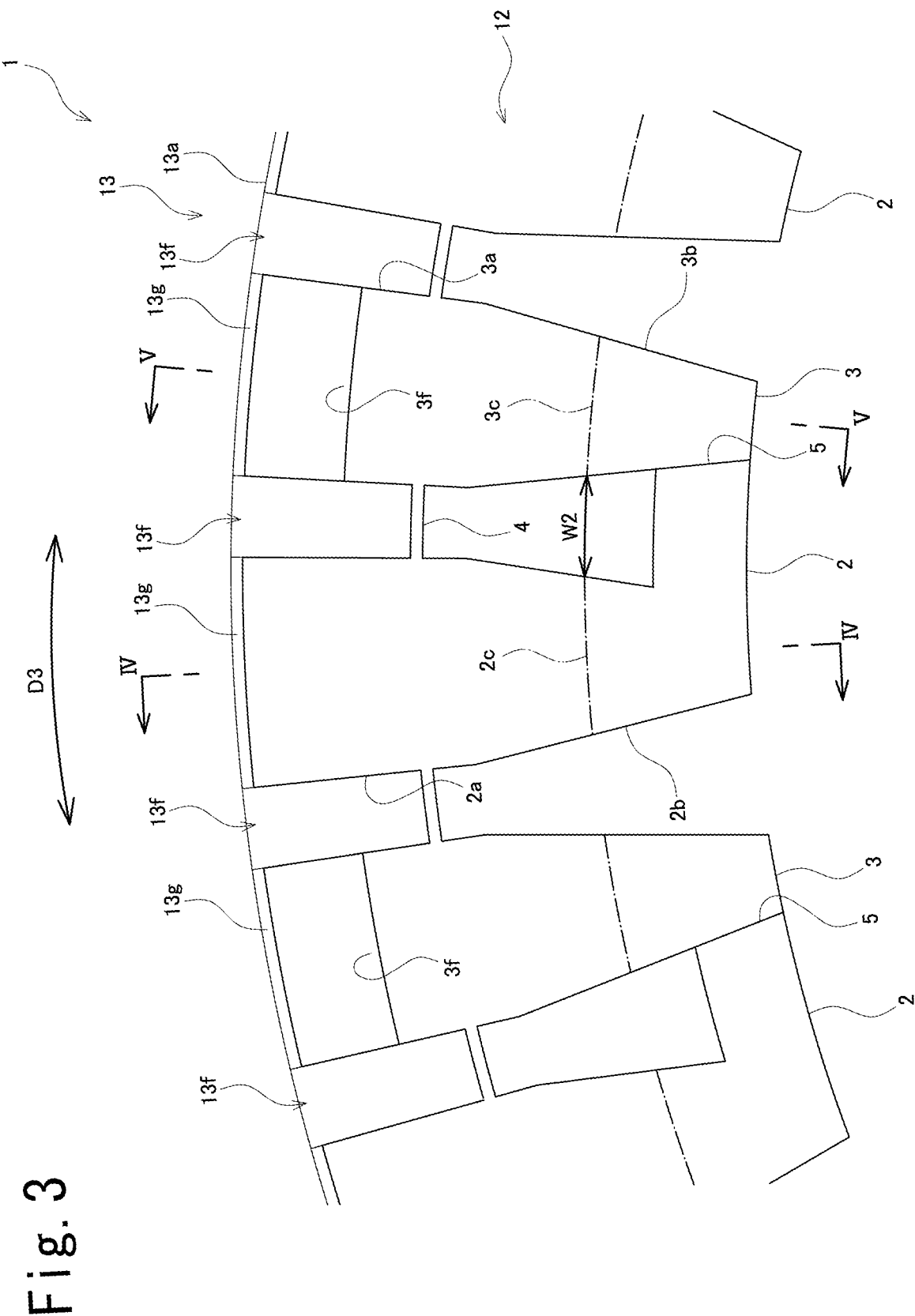
FIG. 3 is a side view (drawing as viewed in the tire width direction) of the principal components of a pneumatic tire associated with same embodiment.

As shown in FIG. 2 and FIG. 3, tread region 13 comprises a plurality of grooves 13*f* extending to the outer end in the tire width direction D1, and a plurality of tread blocks 13*g* partitioned by the plurality of grooves 13*f* so as to be arrayed in the tire circumferential direction D3. Furthermore, sidewall region 12 comprises a plurality of side blocks 2, 3 which are arrayed in the tire circumferential direction D3, and annular projection(s) 4 which extend in the tire circumferential direction D3 and which protrude in the tire width direction D1.

Side blocks 2, 3 have surface irregularities. This permits formation of surface and edge components. In addition, at locations where contact with the ground takes place at mud, sand, or rock, formation of irregular shapes permits increase in the area over which contact with the ground occurs at mud, sand, or rock; furthermore, surfaces and edges resulting from such irregular shapes facilitate contact with the ground at mud, sand, or rock at a variety of locations. In this way, formation of irregular shapes at locations where contact with the ground takes place at mud, sand, or rock improves traction capability.

In addition, side blocks 2, 3 are arranged at least at the exterior in the tire radial direction D2 of sidewall regions 12. While there is no particular limitation with respect thereto, side blocks 2, 3 might, for example, arranged toward the exterior in the tire radial direction D2 from bead end locations 12c (see FIG. 1) of sidewall regions 12. Furthermore, side blocks 2, 3 might, for example, arranged toward the exterior in the tire radial direction D2 from tire maximum width locations 12b (see FIG. 1) of sidewall regions 12.

As a result, under muddy and/or sandy conditions, when the weight of the vehicle causes tire 1 to sink such that it is buried under mud and/or sand, side blocks 2, 3 are able to come in contact with the ground; and under rocky conditions, side blocks 2, 3 are able to come in contact with irregular surfaces of rocks. That is, side blocks 2, 3 come in contact with the ground under bad road conditions such as when the terrain is muddy, sandy, and/or rocky. Note that side blocks 2, 3 do not come in contact with the ground during normal travel on a flat road.

As shown in FIG. 3, as viewed in the tire width direction D1, the plurality of side blocks 2, 3 appear to at least partially overlap tread blocks 13g in the tire radial direction D2. While there is no particular limitation with respect thereto, in accordance with the present embodiment, the number of side blocks 2, 3 is the same as the number of tread blocks 13g.

It so happens that the plurality of side blocks 2, 3 include first side blocks 2 and second side blocks 3 which are adjacent in the tire circumferential direction D3. While there is no particular limitation with respect thereto, in accordance with the present embodiment, first side blocks 2 and second side blocks 3 are arranged in alternating fashion in the tire circumferential direction D3.

First side block 2 comprises first outer portion 2a which is arranged toward the exterior in the tire radial direction D2 from annular projection 4, and first inner portion 2b which is arranged toward the interior in the tire radial direction D2 from annular projection 4. Second side block 3 comprises second outer portion 3a which is arranged toward the exterior in the tire radial direction D2 from annular projection 4, and second inner portion 3b which is arranged toward the interior in the tire radial direction D2 from annular projection 4.

Furthermore, the location at which the distance W2 in the tire circumferential direction D3 between first inner portion 2b and second inner portion 3b is a minimum is toward the interior in the tire radial direction D2 from the centers 2c, 3c in the tire radial direction D2 of first inner portion 2b and second inner portion 3b. As a result, there will be a tendency for production of traction at side blocks 2, 3 to cause occurrence of damage at, for example, the side blocks 2, 3 themselves (especially inner portions 2b, 3b) and at regions peripheral thereto.

While there is no particular limitation with respect thereto, in accordance with the present embodiment, distance W2 between inner portions 2b, 3b is a minimum at the inner ends in the tire radial direction D2 of respective inner portions 2b, 3b. More specifically, the inner ends in the tire radial direction D2 of respective inner portions 2b, 3b are mutually contiguous. That is, in accordance with the present embodiment, the minimum value of the distance W2 between inner portions 2b, 3b is zero. Furthermore, in accordance with the present embodiment, step 5 (also see FIG. 2) is provided at the boundary between first inner portion 2b and second inner portion 3b.

Here, the pattern of surface irregularities formed by first side blocks 2 and second side blocks 3 relative to the profile surface (reference surface) of tire 1 will be described with reference to FIG. 4 and FIG. 5. At FIG. 4 and FIG. 5, note that the double-dash chain line indicates profile surface S2, and the dashed line indicates annular projection 4.

Figure 4:
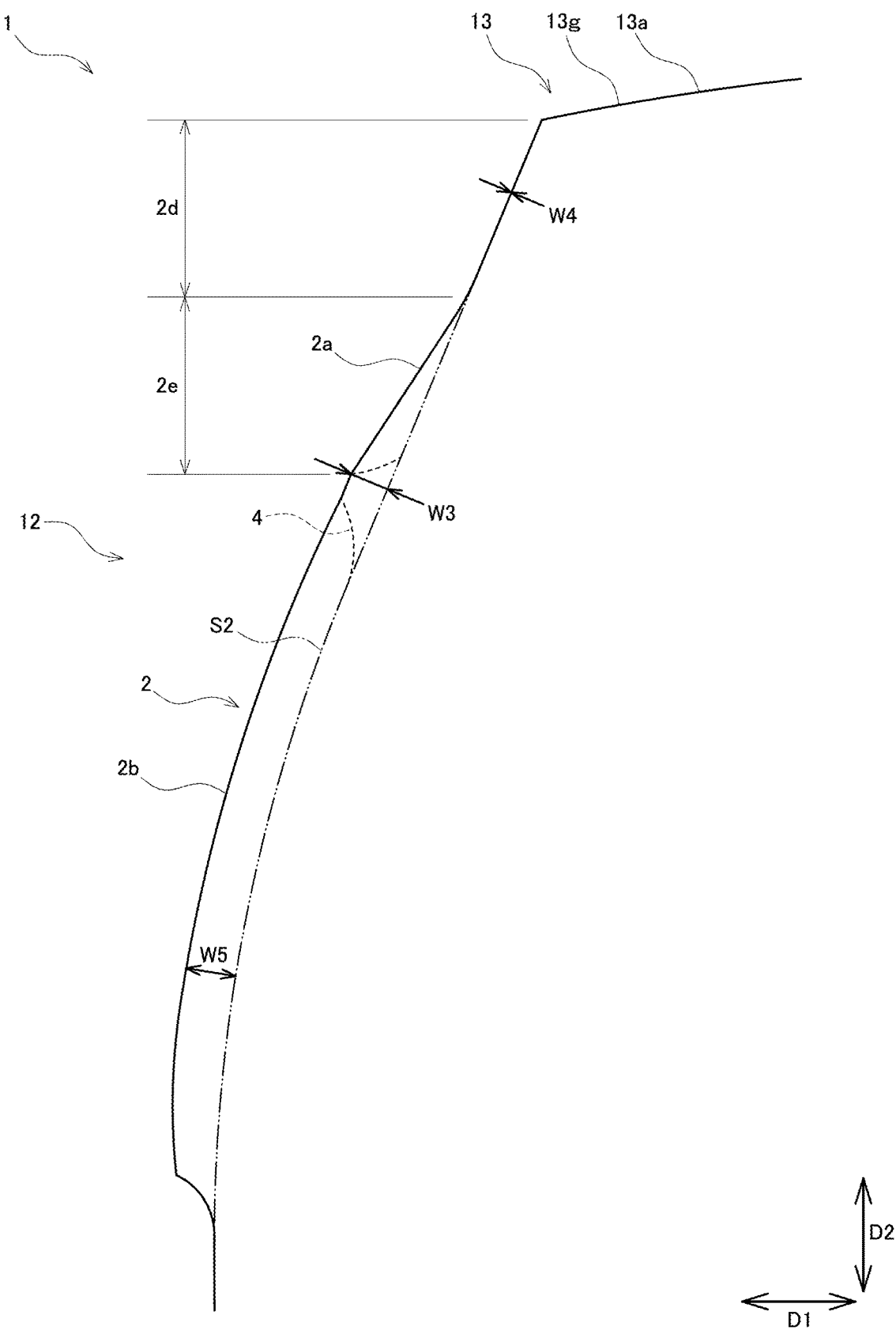
FIG. 4 is an enlarged view of the principal components in a section taken along IV-IV in FIG. 3.

As shown in FIG. 4, first outer portion 2a comprises first outermost portion 2d which is arranged toward the exterior in the tire radial direction D2, and first intermediate portion 2e which is arranged toward the interior in the tire radial direction D2. This being the case, first intermediate portion 2e is arranged between first outermost portion 2d and first inner portion 2b. Note that first outermost portion 2d and first intermediate portion 2e are those regions into which first outer portion 2a is divided when bisected in the tire radial direction D2.

In addition, the location at which the amount by which first outer portion 2a protrudes relative to profile surface S2 in a direction normal to profile surface S2 is a maximum (also referred to as the "first outer maximum protruding location") is a prescribed location at first intermediate portion 2e. While there is no particular limitation with respect thereto, in accordance with the present embodiment, the first outer maximum protruding location is the inner end in the tire radial direction D2 of first outer portion 2a. Note that the maximum value W3 of the amount by which first outer portion 2a protrudes relative to profile surface S2 is referred to as the first outer maximum protruding amount W3.

Furthermore, the location at which the amount by which first outer portion 2a is recessed relative to profile surface S2 in a direction normal to profile surface S2 is a maximum (also referred to as the "first outer maximum recessed location") is a prescribed location at first outermost portion 2d. Note that the maximum value W4 of the amount by which first outer portion 2a is recessed relative to profile surface S2 is referred to as the first outer maximum recessed amount W4. In addition, the first outer maximum recessed location is toward the exterior in the tire radial direction D2 from the first outer maximum protruding location. While there is no particular limitation with respect thereto, in accordance with the present embodiment, note that the first outer maximum recessed amount W4 is zero.

Furthermore, the location at which the amount by which first inner portion 2b protrudes relative to profile surface S2 in a direction normal to profile surface S2 is a maximum (also referred to as the "first inner maximum protruding location") is a prescribed location toward the interior in the tire radial direction D2 within first inner portion 2b. Note that the maximum value W5 of the amount by which first inner portion 2b protrudes relative to profile surface S2 is referred to as the first inner maximum protruding amount W5.

Figure 5:
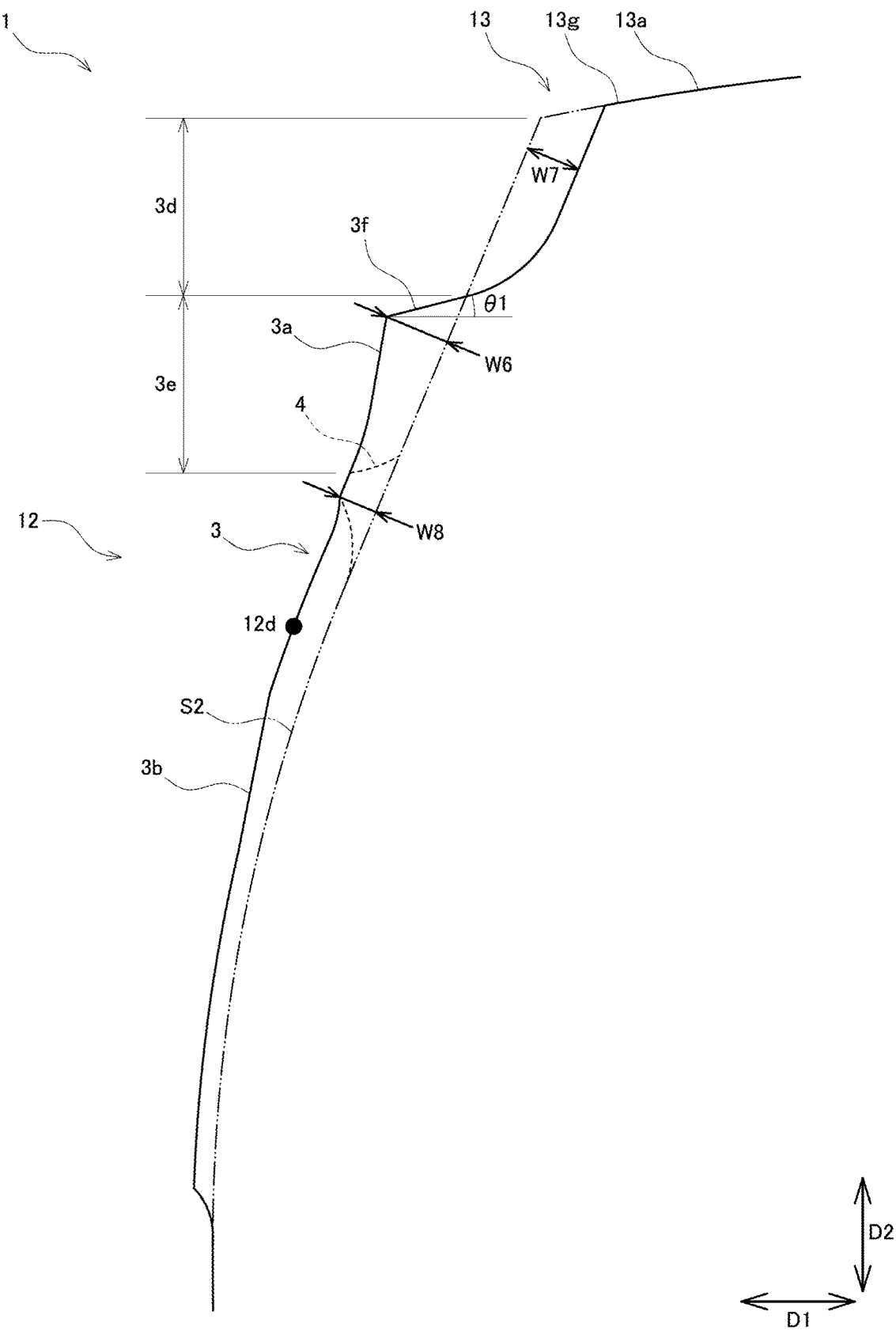
FIG. 5 is an enlarged view of the principal components in a section taken along V-V in FIG. 3.

As shown in FIG. 5, second outer portion 3a comprises second outermost portion 3d which is arranged toward the exterior in the tire radial direction D2, and second intermediate portion 3e which is arranged toward the interior in the tire radial direction D2. This being the case, second intermediate portion 3e is arranged between second outermost portion 3d and second inner portion 3b. Note that second outermost portion 3d and second intermediate portion 3e are those regions into which second outer portion 3a is divided when bisected in the tire radial direction D2.

In addition, the location at which the amount by which second outer portion 3a protrudes relative to profile surface S2 in a direction normal to profile surface S2 is a maximum (also referred to as the "second outer maximum protruding location") is a prescribed location at second intermediate portion 3e. Note that the maximum value W6 of the amount by which second outer portion 3a protrudes relative to profile surface S2 is referred to as the second outer maximum protruding amount W6.

Furthermore, the location at which the amount by which second outer portion 3a is recessed relative to profile surface S2 in a direction normal to profile surface S2 is a maximum (also referred to as the "second outer maximum recessed location") is a prescribed location at second outermost portion 3d. Note that the maximum value W7 of the amount by which second outer portion 3a is recessed relative to profile surface S2 is referred to as the second outer maximum recessed amount W7. In addition, the second outer maximum recessed location is toward the exterior in the tire radial direction D2 from the second outer maximum protruding location.

Furthermore, the location at which the amount by which second inner portion 3b protrudes relative to profile surface S2 in a direction normal to profile surface S2 is a maximum (also referred to as the "second inner maximum protruding location") is the outer end in the tire radial direction D2 of second inner portion 3b. Note that the maximum value W8 of the amount by which second inner portion 3b protrudes relative to profile surface S2 is referred to as the second inner maximum protruding amount W8.

In addition, as shown in FIG. 4 and FIG. 5, second outer maximum protruding amount W6 is greater than first outer maximum protruding amount W3. Furthermore, second outer maximum recessed amount W7 is greater than first outer maximum recessed amount W4. In addition, first inner maximum protruding amount W5 is greater than second inner maximum protruding amount W8.

While there is no particular limitation with respect thereto, in accordance with the present embodiment, note that second outer maximum protruding amount W6 is greater than second outer maximum recessed amount W7. Furthermore, while there is no particular limitation with respect thereto, in accordance with the present embodiment, second outer maximum protruding amount W6 and second outer maximum recessed amount W7 are each greater than first inner maximum protruding amount W5.

As shown in FIG. 5, it so happens that second side block 3 comprises outward facing surface 3f (also see FIG. 2 and FIG. 3) which faces the exterior in the tire radial direction D2. In addition, outward facing surface 3f is arranged toward the exterior in the tire radial direction D2 from belt end location 12d. While there is no particular limitation with respect thereto, as viewed in a tire meridional section, note that intersection angle θ1 that outward facing surface 3f makes with tire width direction D1 might, for example, be not greater than 45°; or might, for example, be not greater than 30°; or might, for example, be not greater than 15°.

Furthermore, the location of the outer end in the tire width direction D1 of outward facing surface 3f is the second outer maximum protruding location. This being the case, because outward facing surface 3f of second side block 3 protrudes toward the exterior in the tire width direction D1 by a large amount, it will be possible to ensure that the amount by which outward facing surface 3f of second side block 3 protrudes in the tire width direction D1 is adequate. Accordingly, it will, for example, be possible to increase the traction produced by outward facing surface 3f.

Next, the difference in the pattern of surface irregularities at first side block 2 and second side block 3 will be described with reference to FIG. 6. Note that FIG. 6 is a drawing in which FIG. 4 and FIG. 5 are placed one atop the other; that is, the drawing depicts the situation as it appears when viewed in the tire circumferential direction D3, the solid line indicates the outer edge of first side block 2, the dashed line indicates the outer edge of second side block 3, and the double-dash chain line indicates profile surface S2 and annular projection 4.

Figure 6:
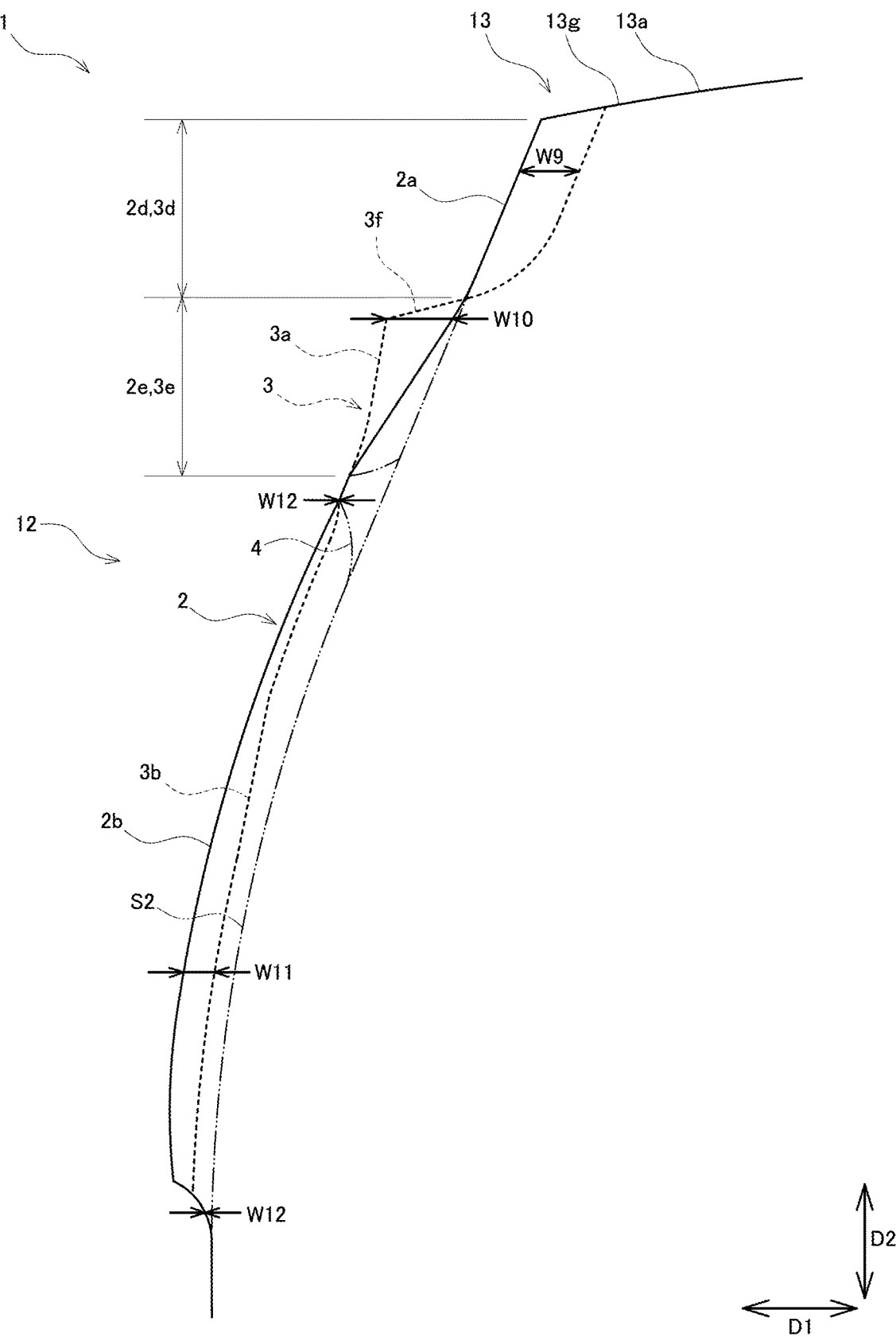

As shown in FIG. 6, as viewed in the tire circumferential direction D3, the location at which the amount by which first outer portion 2a protrudes toward the exterior in the tire width direction D1 beyond second outer portion 3a is a maximum (also referred to as the "first outer maximum protruding difference location") is a prescribed location at first outermost portion 2d. Note that the maximum value W9 of the amount by which first outer portion 2a protrudes toward the exterior in the tire width direction D1 beyond second outer portion 3a is referred to as the first outer maximum protruding difference W9.

Furthermore, as viewed in the tire circumferential direction D3, the location at which the amount by which second outer portion 3a protrudes toward the exterior in the tire width direction D1 beyond first outer portion 2a is a maximum (also referred to as the "second outer maximum protruding difference location") is a prescribed location at second intermediate portion 3e. Note that the maximum value W10 of the amount by which second outer portion 3a protrudes toward the exterior in the tire width direction D1 beyond first outer portion 2a is referred to as the second outer maximum protruding difference W10.

In addition, second outer maximum protruding difference W10 is greater than first outer maximum protruding difference W9. Furthermore, the second outer maximum protruding difference location is toward the interior in the tire radial direction D2 from the first outer maximum protruding difference location. Note that the second outer maximum protruding difference location is located at the outer end in the tire width direction D1 of outward facing surface 3f.

Furthermore, as viewed in the tire circumferential direction D3, the location at which the amount by which first inner portion 2b protrudes toward the exterior in the tire width direction D1 beyond second inner portion 3b is a maximum (also referred to as the "first inner maximum protruding difference location") is a prescribed location toward the interior in the tire radial direction D2 within first inner portion 2b. Note that the maximum value W11 of the amount by which first inner portion 2b protrudes toward the exterior in the tire width direction D1 beyond second inner portion 3b is referred to as the first inner maximum protruding difference W11.

Furthermore, as viewed in the tire circumferential direction D3, the locations at which the amount by which second inner portion 3b protrudes toward the exterior in the tire width direction D1 beyond first inner portion 2b is a maximum (also referred to as the "second inner maximum protruding difference locations") are the inner end and the outer end in the tire radial direction D2 of second inner portion 3b. Note that the maximum value W12 of the amount by which second inner portion 3b protrudes toward the exterior in the tire width direction D1 beyond first inner portion 2b is referred to as the second inner maximum protruding difference W12.

In addition, first inner maximum protruding difference W11 is greater than second inner maximum protruding difference W12. While there is no particular limitation with respect thereto, in accordance with the present embodiment, note that the second inner maximum protruding difference W12 is zero. Furthermore, while there is no particular limitation with respect thereto, in accordance with the present embodiment, second outer maximum protruding difference W10 and first outer maximum protruding difference W9 are each greater than first inner maximum protruding difference W11.

Note that the foregoing respective dimensions and the relative magnitudes thereamong should be understood to be as measured under normal conditions when a tire mounted on a normal rim and inflated to normal internal pressure is under no load. A normal rim is that particular rim which is specified for use with a particular tire 1 in the context of the body of standards that contains the standard that applies to the tire 1 in question, this being referred to, for example, as a standard rim in the case of JATMA, or a measuring rim in the cases of TRA and ETRTO.

Furthermore, normal internal pressure is that air pressure which is specified for use with a particular tire 1 in the context of the body of standards that contains the standard that applies to the tire 1 in question, this being "maximum air pressure" in the case of JATMA, the maximum value listed at the table entitled "Tire Load Limits at Various Cold Inflation Pressures" in the case of TRA, or "inflation pressure" in the case of ETRTO.

Constitution of tire 1 associated with the present embodiment is as described above; action of tire 1 associated with the present embodiment is described below.

As shown in FIG. 4 through FIG. 6, whereas first outermost portion 2d is located toward the exterior in the tire width direction D1 from second outermost portion 3d, second intermediate portion 3e is located toward the exterior in the tire width direction D1 from first intermediate portion 2e. Moreover, whereas second intermediate portion 3e is located toward the exterior in the tire width direction D1 from first intermediate portion 2e, first inner portion 2b is located toward the exterior in the tire width direction D1 from second inner portion 3b.

This being the case, at first side block 2, there is a tendency for a large amount of traction to be produced at first outermost portion 2d and first inner portion 2b, and there is a tendency for a small amount of traction to be produced at first intermediate portion 2e. On the other hand, at second side block 3, there is a tendency for a large amount of traction to be produced at second intermediate portion 3e, and there is a tendency for a small amount of traction to be produced at second outermost portion 3d and second inner portion 3b.

Thus, the portions at which large amounts of traction are produced are distributed among first side blocks 2 and second side blocks 3. Accordingly, it will be possible to suppress occurrence of bias in the respective amounts of traction produced by first side blocks 2 and second side blocks 3 that are mutually adjacent in the tire circumferential direction D3. As a result, it will be possible to suppress occurrence of damage at, for example, the side blocks 2, 3 themselves and at regions peripheral thereto.

As described above, the pneumatic tire 1 of the embodiment includes a sidewall region 12 that extends in a tire radial direction D2;

the sidewall region 12 comprises a plurality of side blocks 2, 3 which are arrayed in a tire circumferential direction D3, and an annular projection 4 which extends in the tire circumferential direction D3 and which protrudes in a tire width direction D1;

the plurality of side blocks 2, 3 include a first side block 2 and a second side block 3 that are adjacent in the tire circumferential direction D3;

the first side block 2 comprises a first outer portion 2a which is arranged toward the exterior in the tire radial direction D2 from the annular projection 4, and a first inner portion 2b which is arranged toward the interior in the tire radial direction D2 from the annular projection 4;

the second side block 3 comprises a second outer portion 3a which is arranged toward the exterior in the tire radial direction D2 from the annular projection 4, and a second inner portion 3b which is arranged toward the interior in the tire radial direction D2 from the annular projection 4;

a location at which distance W2 in the tire circumferential direction D3 between the first inner portion 2b and the second inner portion 3b is a minimum is toward the interior in the tire radial direction D2 from centers 2c, 3c in the tire radial direction D2 of first inner portion 2b and second inner portion 3b;

as viewed in the tire circumferential direction D3, a maximum value W11 of an amount by which the first inner portion 2b protrudes toward the exterior in the tire width direction D1 beyond the second inner portion 3b is greater than a maximum value W12 of an amount by which the second inner portion 3b protrudes toward the exterior in the tire width direction D1 beyond the first inner portion 2b; and as viewed in the tire circumferential direction D3, a maximum value W10 of an amount by which the second outer portion 3a protrudes toward the exterior in the tire width direction D1 beyond the first outer portion 2a is greater than a maximum value W9 of an amount by which the first outer portion 2a protrudes toward the exterior in the tire width direction D1 beyond the second outer portion 3a.

In accordance with such constitution, as viewed in the tire circumferential direction D3, because the maximum value W11 of the amount by which first inner portion 2b protrudes toward the exterior in the tire width direction D1 beyond second inner portion 3b is large, there is a tendency for the traction that is produced by first inner portion 2b of first side block 2 to be large. Furthermore, as viewed in the tire circumferential direction D3, because the maximum value W10 of the amount by which second outer portion 3a protrudes toward the exterior in the tire width direction D1 beyond first outer portion 2a is large, there is a tendency for the traction that is produced by second outer portion 3a of second side block 3 to be large.

This being the case, the portions at which large amounts of traction tend to be produced are distributed among first side blocks 2 and second side blocks 3. Accordingly, it will be possible to suppress occurrence of bias in the respective amounts of traction produced by first side blocks 2 and second side blocks 3 that are mutually adjacent in the tire circumferential direction D3.

Further, in the pneumatic tire 1 of the embodiment,
a location at which an amount by which the second outer portion 3a protrudes toward the exterior in the tire width direction D1 beyond the first outer portion 2a is a maximum value W10 is toward the interior in the tire radial direction from a location at which an amount by which the first outer portion 2a protrudes toward the exterior in the tire width direction D1 beyond the second outer portion 3a is a maximum value W9.

In accordance with such constitution, at second outer portion 3a of second side block 3, that portion 3e which is toward the interior in the tire radial direction D2 is where the traction that is produced tends to be large. On the other hand, at first outer portion 2a of first side block 2, that portion 2d which is toward the exterior in the tire radial direction D2 is where the traction that is produced tends to be large; moreover, the traction that is produced at first inner portion 2b of first side block 2 tends to be large. This being the case, the portions at which large amounts of traction are produced are effectively distributed among first side blocks 2 and second side blocks 3.

Further, in the pneumatic tire 1 of the embodiment,
the second side block 3 further comprises an outward facing surface 3f which faces the exterior in the tire radial direction D2; and
a location of an outer end in the tire width direction D1 of the outward facing surface 3f is a location at which an amount by which the second outer portion 3a protrudes toward the exterior in the tire width direction D1 beyond the first outer portion 2a is a maximum value W10.

In accordance with such constitution, outward facing surface 3f of second side block 3 protrudes toward the exterior in the tire width direction D1 by a large amount. This being the case, it will be possible to ensure that the amount by which outward facing surface 3f of second side block 3 protrudes in the tire width direction D1 is adequate.

Further, the pneumatic tire 1 of the embodiment includes a sidewall region 12 that extends in a tire radial direction D2;
the sidewall region 12 comprises a plurality of side blocks 2, 3 which are arrayed in a tire circumferential direction D3, and an annular projection 4 which extends in the tire circumferential direction D3 and which protrudes in a tire width direction D1;
the plurality of side blocks 2, 3 include a first side block 2 and a second side block 3 that are adjacent in the tire circumferential direction D3;
the first side block 2 comprises a first outer portion 2a which is arranged toward the exterior in the tire radial direction D2 from the annular projection 4, and a first inner portion 2b which is arranged toward the interior in the tire radial direction D2 from the annular projection 4;
the second side block 3 comprises a second outer portion 3a which is arranged toward the exterior in the tire radial direction D2 from the annular projection 4, and a second inner portion 3b which is arranged toward the interior in the tire radial direction D2 from the annular projection 4;
a location at which distance W2 in the tire circumferential direction D3 between the first inner portion 2b and the second inner portion 3b is a minimum is toward the interior in the tire radial direction D2 from centers 2c, 3c in the tire radial direction D2 of first inner portion 2b and second inner portion 3b;
a maximum value W5 of an amount by which the first inner portion 2b protrudes relative to a profile surface S2 is greater than a maximum value W8 of an amount by which the second inner portion 3b protrudes relative to the profile surface S2; and
a maximum value W6 of an amount by which the second outer portion 3a protrudes relative to the profile surface S2 is greater than a maximum value W3 of an amount by which the first outer portion 2a protrudes relative to the profile surface S2.

In accordance with such constitution, because the maximum value W5 of the amount by which first inner portion 2b protrudes relative to profile surface S2 is large, there is a tendency for the traction that is produced by first inner portion 2b of first side block 2 to be large. Furthermore, because the maximum value W6 of the amount by which second outer portion 3a protrudes relative to profile surface S2 is large, there is a tendency for the traction that is produced by second outer portion 3a of second side block 3 to be large.

This being the case, the portions at which large amounts of traction tend to be produced are distributed among first side blocks 2 and second side blocks 3. Accordingly, it will be possible to suppress occurrence of bias in the respective amounts of traction produced by first side blocks 2 and second side blocks 3 that are mutually adjacent in the tire circumferential direction D3.

Further, in the pneumatic tire 1 of the embodiment,
a maximum value W7 of an amount by which the second outer portion 3a is recessed relative to a profile surface S2 is greater than a maximum value W4 of an amount by which the first outer portion 2a is recessed relative to the profile surface S2; and
a location at which an amount by which the second outer portion 3a protrudes relative to the profile surface S2 is a maximum value W6 is toward the interior in the tire radial direction D2 from a location at which an amount by which the second outer portion 3a is recessed relative to the profile surface S2 is a maximum value W7.

In accordance with such constitution, at second outer portion 3a of second side block 3, that portion 3e which is toward the interior in the tire radial direction D2 is where the traction that is produced tends to be large. On the other hand, at first outer portion 2a of first side block 2, that portion 2d which is toward the exterior in the tire radial direction D2 is where the traction that is produced tends to be large; moreover, the traction that is produced at first inner portion 2b of first side block 2 tends to be large. This being the case, the portions at which large amounts of traction are produced are effectively distributed among first side blocks 2 and second side blocks 3.

Further, in the pneumatic tire 1 of the embodiment,
the second side block 3 further comprises an outward facing surface 3f which faces the exterior in the tire radial direction D2; and
a location of an outer end in the tire width direction D1 of the outward facing surface 3f is a location at which an amount by which the second outer portion 3a protrudes relative to the profile surface S2 is a maximum value W6.

In accordance with such constitution, outward facing surface 3f of second side block 3 protrudes toward the exterior in the tire width direction D1 by a large amount. This being the case, it will be possible to ensure that the amount by which outward facing surface 3f of second side block 3 protrudes in the tire width direction D1 is adequate.

Further, the pneumatic tire 1 of the embodiment further comprises a tread region 13 having a belt region 13c at the interior thereof,
the outward facing surface 3f is arranged toward the exterior in the tire radial direction D2 from an outer end 13e in the tire width direction D1 of the belt region 13c.

In accordance with such constitution, outward facing surface 3f is arranged at that portion of sidewall region 12 which is toward the exterior in the tire radial direction D2. As a result, because traction is produced by outward facing surface 3f at a location which is near the road surface, it will be possible to cause effective production of traction by outward facing surface 3f.

The pneumatic tire 1 is not limited to the configuration of the embodiment described above, and the effects are not limited to those described above. It goes without saying that the pneumatic tire 1 can be variously modified without departing from the scope of the subject matter of the present invention. For example, the constituents, methods, and the like of various modified examples described below may be arbitrarily selected and employed as the constituents, methods, and the like of the embodiments described above, as a matter of course.

(1) The constitution of pneumatic tire 1 associated with the foregoing embodiment is such that first inner portion 2*b* and second inner portion 3*b* are contiguous; that is, the minimum value of the distance W2 between inner portions 2*b* and 3*b* is zero. However, pneumatic tire 1 is not limited to such constitution. For example, as shown in FIG. 7, it is also possible to adopt a constitution in which first inner portion 2*b* and second inner portion 3*b* are separated in the tire circumferential direction D3.

(2) Furthermore, the constitution of pneumatic tire 1 associated with the foregoing embodiment is such that distance W2 between inner portions 2*b* and 3*b* is a minimum at the inner ends in the tire radial direction D2 of respective inner portions 2*b* and 3*b*. However, pneumatic tire 1 is not limited to such constitution.

Figure 7:
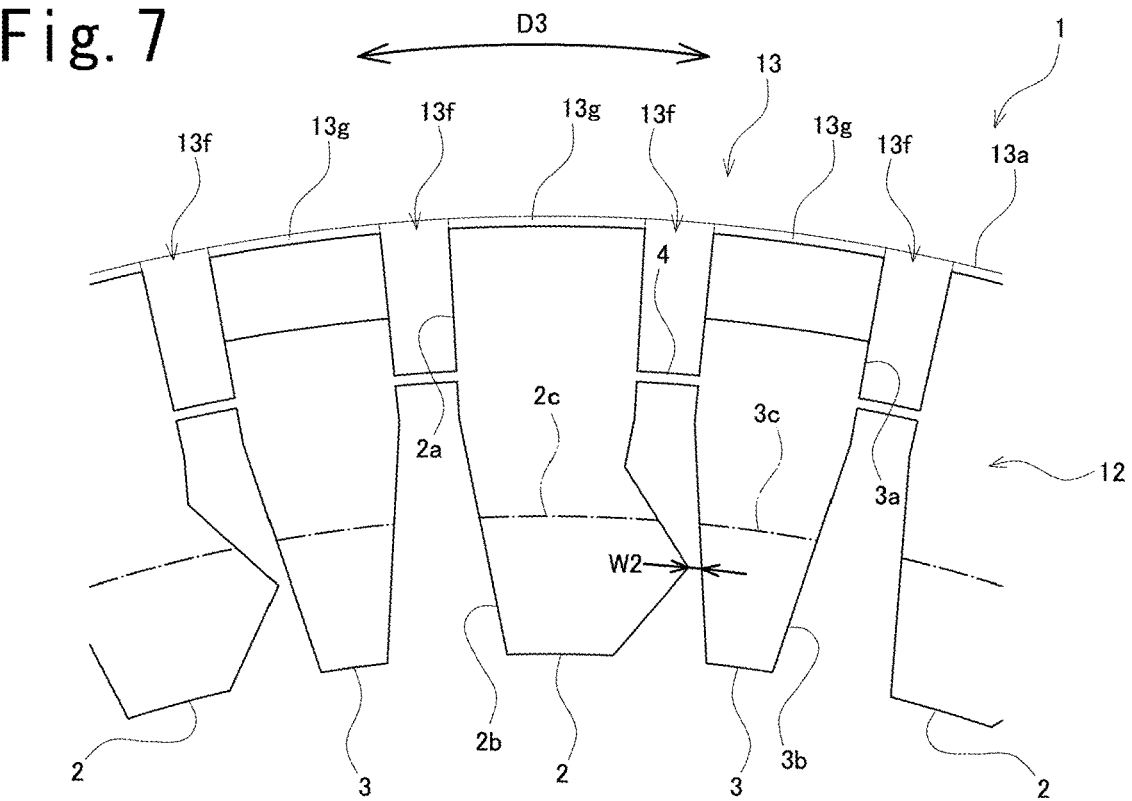
FIG. 7 is a side view (drawing as viewed in the tire width direction) of the principal components of a pneumatic tire associated with another embodiment.

For example, as shown in FIG. 7, it is also possible to adopt a constitution in which distance W2 between inner portions 2*b*, 3*b* is a minimum at location(s) toward the interior in the tire radial direction D2 from the inner end(s) in the tire radial direction D2 of respective inner portion(s) 2*b*, 3*b*. In other words, it is also possible to adopt a constitution in which distance W2 between inner portions 2*b*, 3*b* is a minimum at location(s) toward the interior in the tire radial direction D2 from center(s) 2*c*, 3*c* in the tire radial direction D2 of respective inner portion(s) 2*b*, 3*b*.

(3) Furthermore, the constitution of pneumatic tire 1 associated with the foregoing embodiment is such that step 5 is provided at the boundary between first inner portion 2*b* and second inner portion 3*b*. However, pneumatic tire 1 is not limited to such constitution.

Figure 8:
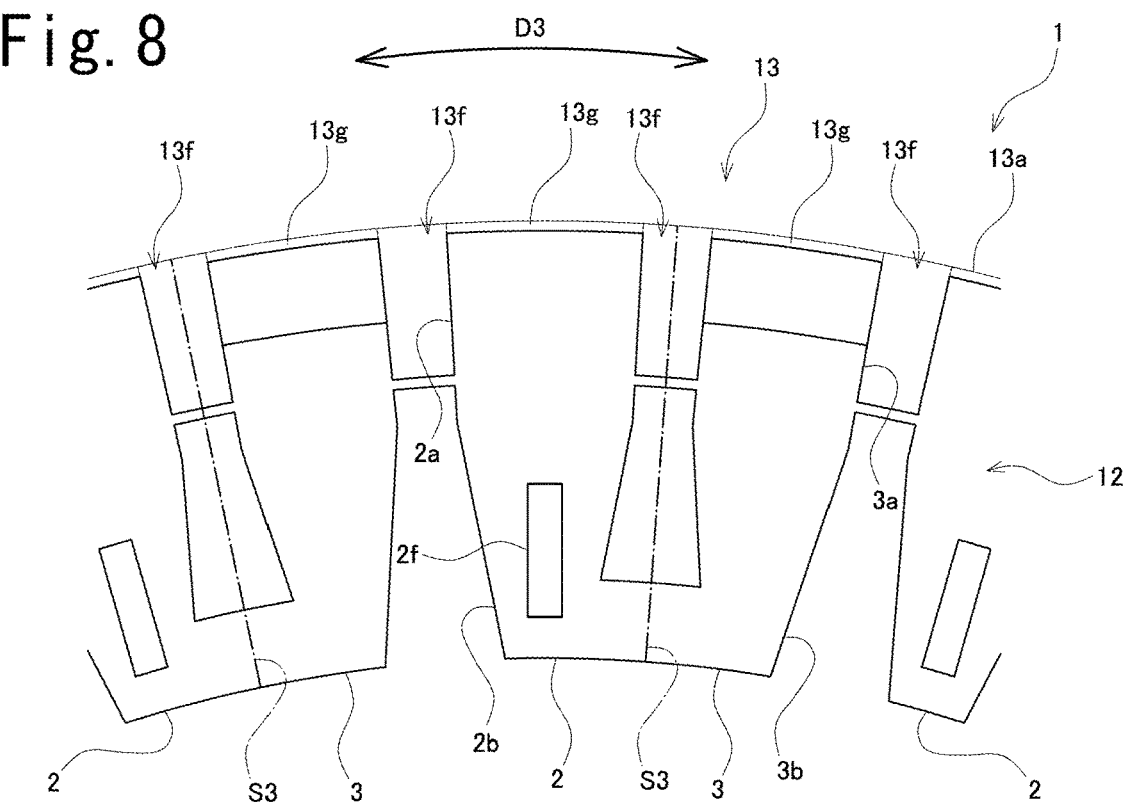
FIG. 8 is a side view (drawing as viewed in the tire width direction) of the principal components of a pneumatic tire associated with yet another embodiment.

For example, as shown in FIG. 8, it is also possible to adopt a constitution in which step 5 is not provided at the boundary between first inner portion 2*b* and second inner portion 3*b*. As shown in FIG. 8, in accordance with such constitution, first inner portion 2*b* and second inner portion 3*b* may be demarcated by a tire meridional plane S3 which passes through the center in the tire circumferential direction D3 of groove 13*f* at tread region 13. While there is no particular limitation with respect thereto, note that first inner portion 2*b* of first side block 2 associated with FIG. 8 comprises projection 2*f* which protrudes in the tire width direction D1.

(4) Furthermore, the constitution of pneumatic tire 1 associated with the foregoing embodiment is such that first side blocks 2 and second side blocks 3 are arranged in alternating fashion in the tire circumferential direction D3. However, pneumatic tire 1 is not limited to such constitution. For example, it is also possible to adopt a constitution in which sidewall region 12 comprises—in addition to first side blocks 2 and second side blocks 3—side block(s) other than first side blocks 2 and second side blocks 3.

(5) Furthermore, the constitution of pneumatic tire 1 associated with the foregoing embodiment is such that the second outer maximum protruding difference location (the location at which the amount by which second outer portion 3*a* protrudes toward the exterior in the tire width direction D1 beyond first outer portion 2*a* is a maximum value W10) is toward the interior in the tire radial direction D2 from the first outer maximum protruding difference location (the location at which the amount by which first outer portion 2*a* protrudes toward the exterior in the tire width direction D1 beyond second outer portion 3*a* is a maximum value W9). However, pneumatic tire 1 is not limited to such constitution. For example, it is also possible to adopt a constitution in which the second outer maximum protruding difference location is toward the exterior in the tire radial direction D2 from the first outer maximum protruding difference location.

(6) Furthermore, the constitution of pneumatic tire 1 associated with the foregoing embodiment is such that second side block 3 comprises outward facing surface 3*f* which faces the exterior in the tire radial direction D2. However, pneumatic tire 1 is not limited to such constitution. For example, it is also possible to adopt a constitution in which second side block 3 does not comprise outward facing surface 3*f* which faces the exterior in the tire radial direction D2.

(7) Furthermore, the constitution of pneumatic tire 1 associated with the foregoing embodiment is such that the second outer maximum recessed amount (the maximum value of the amount by which second outer portion 3*a* is recessed relative to profile surface S2) W7 is greater than the first outer maximum recessed amount (the maximum value of the amount by which first outer portion 2*a* is recessed relative to profile surface S2) W4. However, pneumatic tire 1 is not limited to such constitution. For example, it is also possible to adopt a constitution in which the second outer maximum recessed amount W7 is less than the first outer maximum recessed amount W4.

(8) Furthermore, the constitution of pneumatic tire 1 associated with the foregoing embodiment is such that the second outer maximum protruding location (the location at which the amount by which second outer portion 3*a* protrudes relative to profile surface S2 is a maximum value W6) is toward the interior in the tire radial direction D2 from the second outer maximum recessed location (the location at which the amount by which second outer portion 3*a* is recessed relative to profile surface S2 is a maximum value W7). However, pneumatic tire 1 is not limited to such constitution. For example, it is also possible to adopt a constitution in which the second outer maximum protruding location is toward the exterior in the tire radial direction D2 from the second outer maximum recessed location.

(9) Furthermore, the constitution of pneumatic tire 1 associated with the foregoing embodiment is such that the location of the outer end in the tire width direction D1 of outward facing surface 3*f* is the second outer maximum protruding difference location (the location at which the amount by which second outer portion 3*a* protrudes toward the exterior in the tire width direction D1 beyond first outer portion 2*a* is a maximum value W10). However, pneumatic tire 1 is not limited to such constitution. For example, it is also possible to adopt a constitution in which the location of the outer end in the tire width direction D1 of outward facing surface 3*f* is a location other than the second outer maximum protruding difference location.

(10) Furthermore, the constitution of pneumatic tire 1 associated with the foregoing embodiment is such that the location of the outer end in the tire width direction D1 of outward facing surface 3*f* is the second outer maximum protruding location (the location at which the amount by which second outer portion 3*a* protrudes relative to profile surface S2 is a maximum value W6). However, pneumatic tire 1 is not limited to such constitution. For example, it is also possible to adopt a constitution in which the location of the outer end in the tire width direction D1 of outward facing surface 3f is a location other than the second outer maximum protruding location.

(11) Furthermore, the constitution of pneumatic tire 1 associated with the foregoing embodiment is such that outward facing surface 3f is arranged toward the exterior in the tire radial direction D2 from outer end 13e in the tire width direction D1 of belt region 13c. However, pneumatic tire 1 is not limited to such constitution. For example, it is also possible to adopt a constitution in which outward facing surface 3f is arranged toward the interior in the tire radial direction D2 from outer end 13e in the tire width direction D1 of belt region 13c.

(12) Furthermore, the constitution of pneumatic tire 1 associated with the foregoing embodiment is such that outer portions 2a, 3a and inner portions 2b, 3b are contiguous in the tire radial direction D2. However, pneumatic tire 1 is not limited to such constitution. For example, it is also possible to adopt a constitution in which outer portions 2a, 3a and inner portions 2b, 3b are separated in the tire radial direction D2.

(13) Furthermore, at pneumatic tire 1, the constitution may be such that first and second side blocks 2, 3 are provided at only one of the sidewall regions 12, or the constitution may be such that these are provided at both sidewall regions 12. While there is no particular limitation with respect thereto, it is also possible, for example, to adopt a constitution in which first and second side blocks 2, 3 are at least provided at the sidewall region 12 which of the two sidewall regions 12 is the sidewall region 12 that is arranged so as to be toward the exterior when mounted on a vehicle.

The invention claimed is:

1. A pneumatic tire comprising a sidewall region that extends in a tire radial direction wherein:
   the sidewall region comprises a plurality of side blocks which are arrayed in a tire circumferential direction, and an annular projection which extends in the tire circumferential direction and which protrudes in a tire width direction;
   the plurality of side blocks include a first side block and a second side block that are adjacent in the tire circumferential direction;
   the first side block comprises a first outer portion which is arranged toward the exterior in the tire radial direction from the annular projection, and a first inner portion which is arranged toward the interior in the tire radial direction from the annular projection;
   the second side block comprises a second outer portion which is arranged toward the exterior in the tire radial direction from the annular projection, and a second inner portion which is arranged toward the interior in the tire radial direction from the annular projection;
   a location at which distance in the tire circumferential direction between the first inner portion and the second inner portion is a minimum is toward the interior in the tire radial direction from centers in the tire radial direction of first inner portion and second inner portion;
   as viewed in the tire circumferential direction, a maximum value of an amount by which the first inner portion protrudes toward the exterior in the tire width direction beyond the second inner portion is greater than a maximum value of an amount by which the second inner portion protrudes toward the exterior in the tire width direction beyond the first outer portion;
   as viewed in the tire circumferential direction, a maximum value of an amount by which the second outer portion protrudes toward the exterior in the tire width direction beyond the first outer portion is greater than a maximum value of an amount by which the first outer portion protrudes toward the exterior in the tire width direction beyond the second outer portion; and
   a maximum value of an amount by which the second outer portion is recessed relative to a profile surface is greater than a maximum value of an amount by which the first inner portion protrudes relative to the profile surface.

2. The pneumatic tire according to claim 1 wherein a location at which an amount by which the second outer portion protrudes toward the exterior in the tire width direction beyond the first outer portion is a maximum value is toward the interior in the tire radial direction from a location at which an amount by which the first outer portion protrudes toward the exterior in the tire width direction beyond the second outer portion is a maximum value.

3. The pneumatic tire according to claim 1 wherein the second side block further comprises an outward facing surface which faces the exterior in the tire radial direction; and
   a location of an outer end in the tire width direction of the outward facing surface is a location at which an amount by which the second outer portion protrudes toward the exterior in the tire width direction beyond the first outer portion is a maximum value.

4. The pneumatic tire according to claim 3 further comprising a tread region having a belt region at the interior thereof, wherein
   the outward facing surface is arranged toward the exterior in the tire radial direction from an outer end in the tire width direction of the belt region.

5. The pneumatic tire according to claim 1 wherein as viewed in the tire circumferential direction, a maximum value of an amount by which the second outer portion protrudes toward the exterior in the tire width direction beyond the first outer portion is greater than a maximum value of an amount by which the first inner portion protrudes toward the exterior in the tire width direction beyond the second inner portion.

6. The pneumatic tire according to claim 1 wherein as viewed in the tire circumferential direction, a maximum value of an amount by which the first outer portion protrudes toward the exterior in the tire width direction beyond the second outer portion is greater than a maximum value of an amount by which the first inner portion protrudes toward the exterior in the tire width direction beyond the second inner portion.

7. The pneumatic tire according to claim 1 wherein an inner end in the tire radial direction of the first inner portion is contiguous with an inner end in the tire radial direction of the second inner portion; and
   a minimum value of a distance in the tire circumferential direction between the first inner portion and the second inner portion is zero.

8. The pneumatic tire according to claim 7 wherein a step is provided at a boundary between the inner end in the tire radial direction of the first inner portion and the inner end in the tire radial direction of the second inner portion.

9. The pneumatic tire according to claim 1 wherein a maximum value of an amount by which the first inner portion protrudes relative to a profile surface is greater than a maximum value of an amount by which the second inner portion protrudes relative to the profile surface; and a maximum value of an amount by which the second outer portion protrudes relative to the profile surface is greater than a maximum value of an amount by which the first outer portion protrudes relative to the profile surface.

10. The pneumatic tire according to claim 9 wherein
a maximum value of an amount by which the second outer portion is recessed relative to a profile surface is greater than a maximum value of an amount by which the first outer portion is recessed relative to the profile surface; and
a location at which an amount by which the second outer portion protrudes relative to the profile surface is a maximum value is toward the interior in the tire radial direction from a location at which an amount by which the second outer portion is recessed relative to the profile surface is a maximum value.

11. The pneumatic tire according to claim 10 wherein
a maximum value of an amount by which the second outer portion protrudes relative to the profile surface is greater than a maximum value of an amount by which the second outer portion is recessed relative to the profile surface.

12. The pneumatic tire according to claim 9 wherein
the second side block further comprises an outward facing surface which faces the exterior in the tire radial direction; and
a location of an outer end in the tire width direction of the outward facing surface is a location at which an amount by which the second outer portion protrudes relative to the profile surface is a maximum value.

13. The pneumatic tire according to claim 9 wherein
a maximum value of an amount by which the second outer portion protrudes relative to the profile surface is greater than a maximum value of an amount by which the first inner portion protrudes relative to the profile surface.

* * * * *